United States Patent [19]

Mercer

[11] Patent Number: 4,645,354

[45] Date of Patent: Feb. 24, 1987

[54] UNIVERSAL HELIOCHRONOMETER

[75] Inventor: James R. Mercer, Akron, Ohio

[73] Assignee: J. R. Mercer P.E. Company, Akron, Ohio

[21] Appl. No.: 833,536

[22] Filed: Feb. 26, 1986

[51] Int. Cl.[4] .......................... G04B 19/26; G01C 17/34

[52] U.S. Cl. .......................... 368/15; 33/270

[58] Field of Search .......................... 368/10, 15–17; 33/270

[56] References Cited

U.S. PATENT DOCUMENTS

| | | | |
|---|---|---|---|
| 1,209,289 | 12/1916 | Hartman . | |
| 1,570,029 | 1/1926 | Balach | 33/270 |
| 1,629,238 | 5/1927 | Terraz | 33/270 |
| 3,090,124 | 5/1963 | Frühling | 33/270 |
| 3,158,937 | 12/1964 | Flineis | 33/270 |
| 3,303,567 | 2/1967 | Blanks | 33/270 |
| 4,028,813 | 6/1977 | Eldridge | 33/270 |
| 4,081,911 | 4/1978 | Eldridge | 33/270 |
| 4,103,429 | 8/1978 | Wagoner | 33/270 |
| 4,135,357 | 1/1979 | Ashton | 33/270 |

*Primary Examiner*—Vit W. Miska
*Attorney, Agent, or Firm*—Frederick K. Lacher

[57] ABSTRACT

A heliochronometer (10) for providing accurate clock time readouts at any known latitude and longitude location on the earth including, a base (15) to effect precision orientation and level mounting and having an upstanding post (40), a latitude member (45) adjustably angularly positionable relative to the post for selecting a particular latitude, a gnomon assembly (65) extending upwardly from the latitude member, a longitude correction member (75) adjustably pivotally mounted about the gnomon assembly for effecting a longitude correction, a time dial support (20) pivotally mounted about said gnomon assembly and having an arcuate time dial (150) on which the shadow of the gnomon assembly is projected, and assemblies (90, 130) interconnecting the longitude correction member and the time dial support for adjusting the angular position of the time dial for daylight savings time and the equation of time.

24 Claims, 13 Drawing Figures

FIG.-11
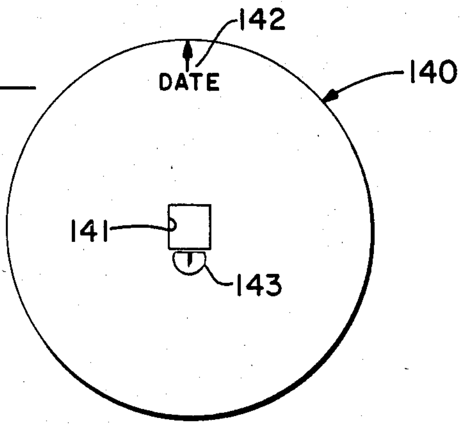
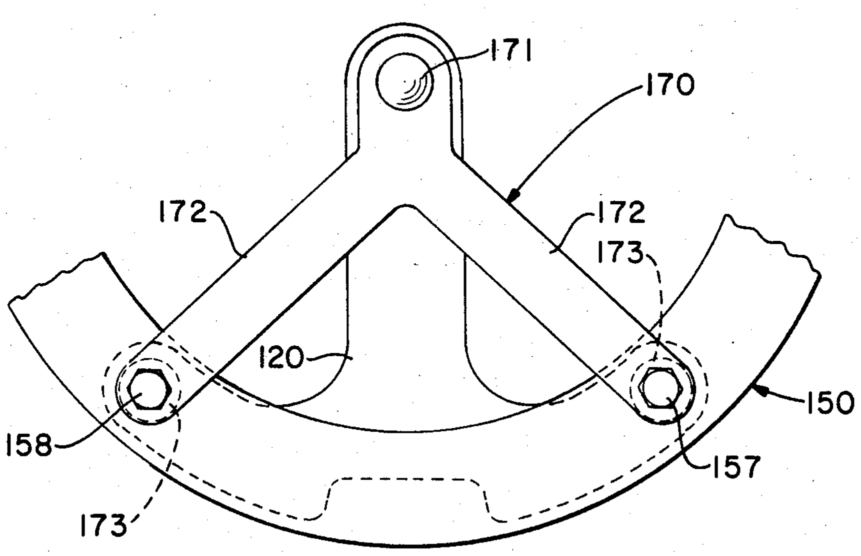
FIG.-13

UNIVERSAL HELIOCHRONOMETER

TECHNICAL FIELD

The present invention relates generally to sun dials employed to determine the time of day. More particularly, the invention relates to a type of sun dial sometimes referred to in the art as a heliochronometer. Specifically, the invention relates to a heliochronometer which combines advanced features, accuracy and an integrated design in devices of this type.

BACKGROUND OF THE INVENTION

Sun dials in various forms have been known and used for centuries to assist in more accurately determining sun time during daylight hours. In their simplest form these sun dials consisted of little more than a vertically upstanding member called a gnomon which upon the incidence of the sun's rays cast a shadow directed upon and along a dial with movement of the sun to establish a line of demarcation between the shadow and areas of direct impingement of the sun's rays. While the early sun dials gave some indications of the same sun time on successive days they were too simplistic to take into account differences in mean time and solar time as a function of the day of the year, locations within a time zone and other variables.

More recently, increasingly sophisticated sun dials were developed and used for many years which endeavored to take into account some of the variables which were not considered in the earlier devices. Certain of the improved devices have employed a dial which is angularly adjustable to compensate for a combination of calculated differences between the sun and clock time in the different seasons of the year. In many instances users have been unable to accurately calculate the required combination of corrections to effect substantial accuracy. Nor can a combined calculation be supplied by a sun dial manufacturer since the magnitude and combination of these calculated adjustments differ in some instances with the time of the year and in other instances with location on the surface of the earth.

In other instances efforts have been made to supply a sun dial having an attachment adapted to compensate at least for differences in mean time and solar time as a function of the day of the year in either the northern or southern hemisphere such that at least this correction from sun time is made by setting the device to the appropriate day of the year with a resulting correction being imparted as between the gnomon and the dial in relation to the path of the sun. More generalized corrections have been attempted by providing a gnomon having a calculated configuration which endeavors to take into account differences between mean time and solar time as a function of the time of the year due to differences in the sun's declination.

To Applicant's knowledge all of the above prior art devices have had serious limitations in their ability to be located at any position on the earth's surface and have the self-contained capability of accurate adjustment to take into account all of the different variables necessary to convert sun time to clock time at any desired location on the surface of the earth.

DISCLOSURE OF THE INVENTION

Accordingly, an object of the present invention is to provide a heliochronometer which takes into account all variables involving geographic location and deviations between sun time and clock time to provide a local clock time readout. Another object of the invention is to provide a heliochronometer wherein all location functions and the deviations from sun time to clock time may be individually set and individually adjusted with changes in location of the heliochronometer or other deviations involving the time of the year. A further object of the invention is to provide a heliochronometer which can be set up and operated at any known latitude and longitude on the surface of the earth based solely upon knowledge of the correct longitude and latitude and without extraneous inputs from an almanac or other source as to equation of time corrections or other deviations. Yet another object of the invention is to provide a heliochronometer which can be quickly and easily adjusted by even relatively inexperienced and nonscientific personnel without the necessity of resort to conversion tables, compound calculations, or other computations.

A further object of the present invention is to provide a heliochronometer which is a small, compact, interrelated unit that is readily portable for movement to different geographic locations, if desired. A still further object of the invention is to provide a heliochronometer which in having individual adjustments for all variable inputs is particularly adapted for use in a plurality of locations. Yet another object of the present invention is to provide a heliochronometer wherein a number of parts carry multiple indicia for use in both the northern and southern hemispheres, thereby eliminating extra parts which could be damaged or lost when not installed on the heliochronometer.

Another object of invention is to provide a time dial having a configuration which allows the time to be read from a number of different positions relative to the sun dial and particularly obviates the necessity of taking time readings from a position substantially between the sun and the heliochronometer. A further object of the invention is to provide a heliochronometer having a time dial where the arcuate extremities are extended for early morning and late evening readings, yet are movably mounted to prevent interference with the incidence of sun rays on the gnomon at certain times of the year. A still further object of the present invention is to provide a small, simple, precision heliochronometer which can be readily manufactured according to known technology with minimal possibilities of damage or loss which could require repair or the replacement of parts. Yet another object of the invention is to provide a heliochronometer cover which affords protection for a projecting gnomon.

In general, a heliochronometer according to the concepts of the present invention for providing accurate clock time readouts at any particular latitude and longitude location on the earth includes, a base to effect precision orientation and level mounting and having an upstanding post, a latitude plate adjustably angularly positionable relative to the upstanding post for selecting a particular latitude, a gnomon extending upwardly from the latitude plate, a longitude plate adjustably pivotally mounted about the gnomon for effecting a longitude correction, a time dial support pivotally mounted about the gnomon and having an arcuate time dial on which the shadow of the gnomon is projected, and mechanism interconnecting the longitude plate and the time dial support for adjusting the angular position of the time dial for daylight savings time and the equation of time.

BRIEF DESCRIPTION OF THE DRAWINGS

FIG. 11 is a top plan view of the cam cover which is positioned atop the equation of time cam with a peripheral indicator for registry with the equation of time dial.

FIG. 13 is a fragmentary top plan view of the heliochronometer of FIGS. 1 and 2 showing a portion of the time dial and the protective cover for the gnomon.

PREFERRED EMBODIMENT FOR CARRYING OUT THE INVENTION

Figure 1:
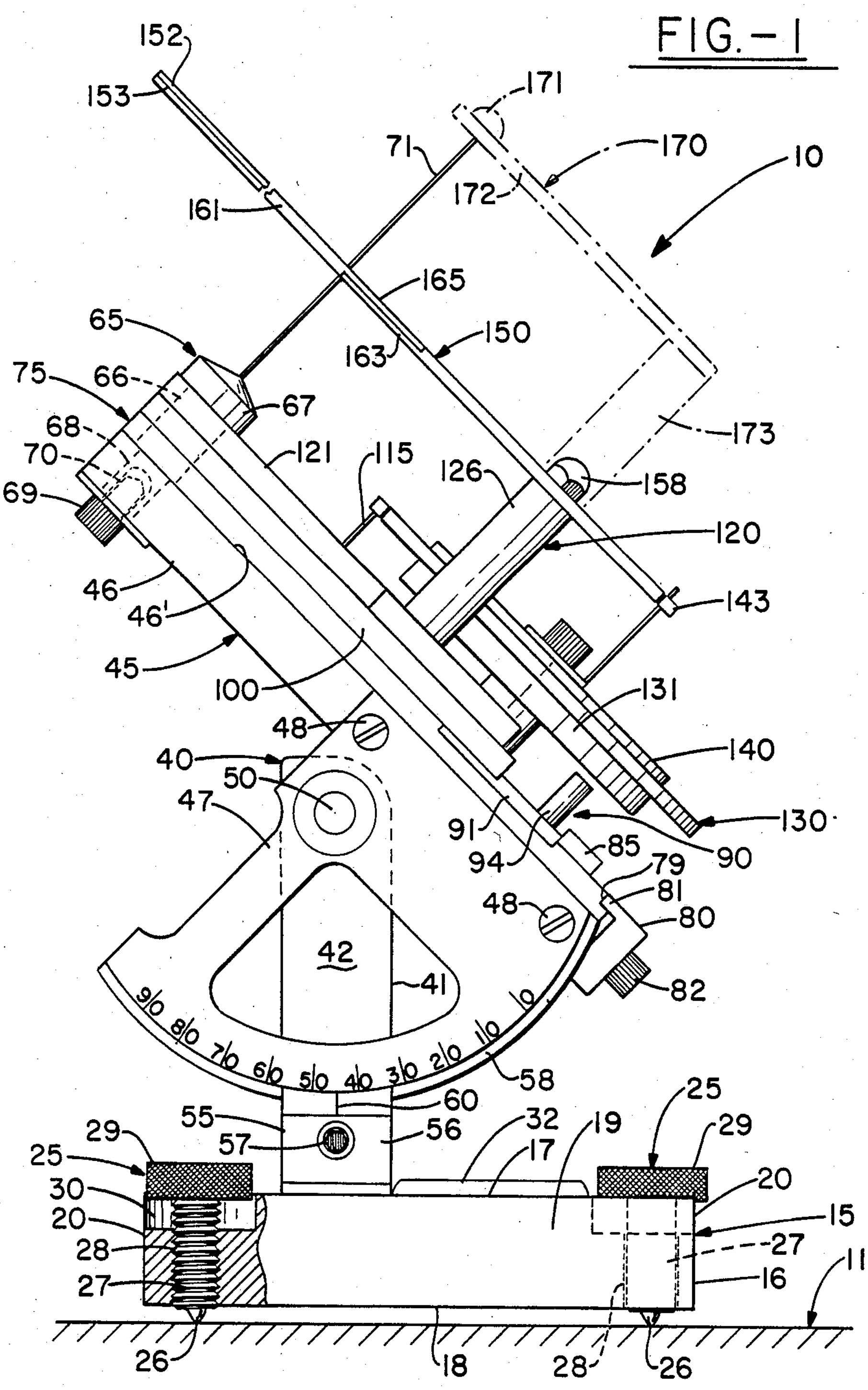
FIG. 1 is a side elevational view of a preferred form of a heliochronometer according to the concepts of the present invention, showing particularly the latitude indicator attached to the latitude plate, an optional protective cover for the gnomon depicted in chain lines and the leveling mechanism seen where portions of the base are broken away.
Figure 2:
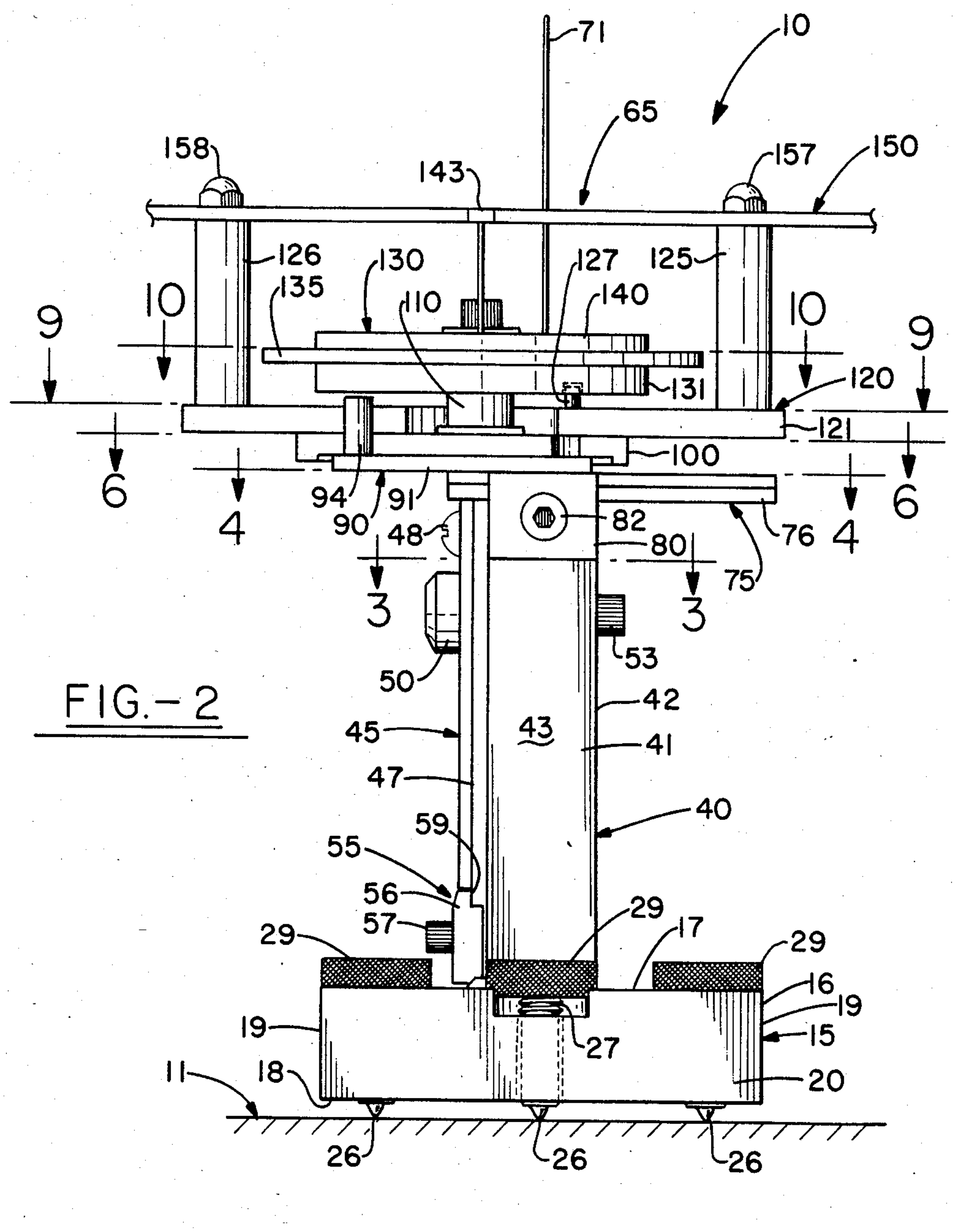
FIG. 2 is a front elevational view of the heliochronometer of FIG. 1 with the latitude plate having been rotated from a position at an acute angle to the vertically extending post portion of the base to a perpendicular or 90° orientation thereto.

Referring now to the drawings, a preferred form of a heliochronometer embodying the concepts of the present invention, generally indicated by the numeral 10, is seen in FIGS. 1 and 2 of the drawings. The heliochronometer 10 is designed to be either temporarily or permanently mounted on an exemplary support surface 11, depicted in FIGS. 1 and 2, which may be any surface reasonably regular and subject to the sun's rays over at least a substantial portion of the day. Permanent mounting locations normally are selected in direct all day sunlight and have the support surface 11 substantially planar and generally horizontal to facilitate mounting of the heliochronometer 10 thereon.

Figure 3:
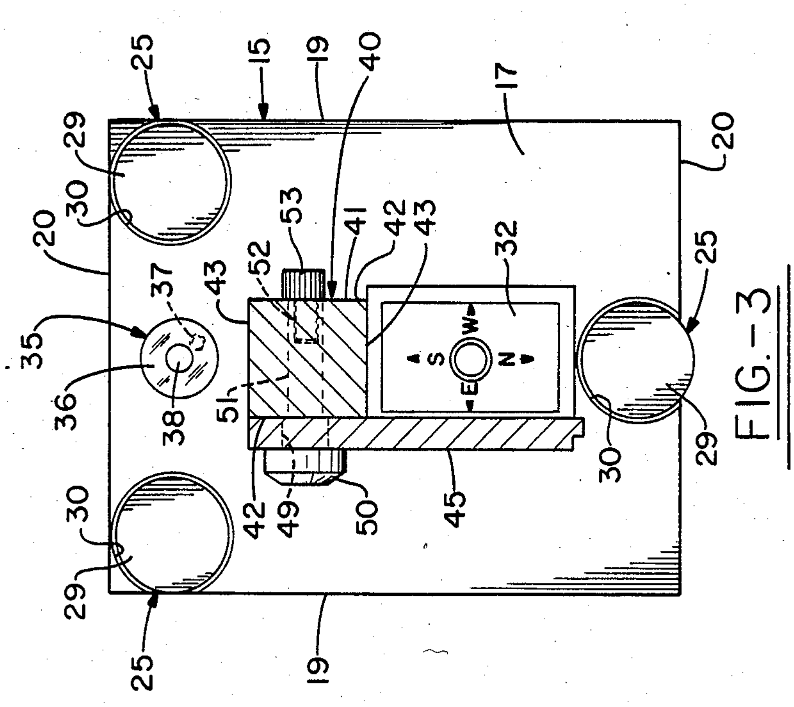
FIG. 3 is a top plan view of the base, taken substantially along the line 3—3 of FIG. 2, showing particularly the leveling system and the alignment system.

As best seen in FIGS. 1, 2 and 3, the heliochronometer 10 has a base, generally indicated by the numeral 15, which is adapted to effect the positioning hereinafter described, on the support surface 11. The base 15 may conveniently include a generally rectangular mounting block 16. As shown, the mounting block 16 has a top surface 17 and a bottom surface 18 which are spaced and joined by a pair of sidewalls 19 and a pair of endwalls 20.

The mounting block 16 is selectively positioned relative to the support surface 11 by a plurality of adjustable screws, generally indicated by the numeral 25. The screws 25 are, as shown, spaced a substantial distance about the block 16 and may conveniently be positioned as best seen in FIG. 3 in a triangular arrangement, i.e., with two of the screws 25 proximate the juncture of an end 20 and the adjacent portions of each of the sides 19 and the third medially of the opposite end 20 of the block 16.

The lower extremity of each of the screws 25 projects from the bottom surface 18 of the mounting block 16 and has a radius end 26 for engaging support surface 11. As shown, the radius ends 26 are each on threaded portions 27 which matingly engage an internally threaded bore 28 extending through the mounting block 16. The threaded portion 27 is rotated to extend and retract the ends 26 relative to block 16 as by thumbwheels 29 which are non-rotatably attached to the screws 25. As shown, the top surface 17 of the block 16 may be provided with bores 30 into which the thumbwheels 29 may be partially or totally recessed. The bores 30 may be positioned essentially tangent to and open on to endwalls 20 and sidewalls 19 such that the thumbwheels 29 may be accessed thereat for necessary rotational adjustment of thumbwheels 29 while precluding inadvertent engagement.

In the process of mounting the base 15 on a support surface 11, the mounting block 16 for the exemplary heliochronometer 10 must have the sidewalls 19 of the mounting block 16 oriented in a north-south direction. To this end the top surface 17 of the mounting block 16 may conveniently have a compass rose 32 affixed thereon as seen in FIG. 3. The north-south orientation of the mounting block 16 may be readily effected by rotation until the north-south indicators on the compass rose 32 parallel the direction of the sidewalls 19. It is to be understood that a separate unattached compass could be similarly employed to make the necessary north-south alignment of mounting block 16.

The adjustable screws 25 are designed to effect an accurate leveling of the mounting block 16 on a support surface 11 irrespective of the fact that the surface 11 is not absolutely level or the surface deviates from planar. The requisite leveling is effected by placing radius ends 26 in an approximately level position on the support surface 11. The relationship of the mounting block 16 relative to a true horizontal plane may be observed by an attached leveling device which, as shown in FIG. 3, may be a spirit level, generally indicated by the numeral 35. According to conventional design, the spirit level 35 is a generally cylindrical closed container 36 which is filled with fluid except for a bubble 37 which is shown in an exemplary out of level position in chain lines in FIG. 3. In the preferred form of the invention, the container 36 of the spirit level 35 is attached to the top surface 17 of the mounting block 16. Located centrally of the container 36 is a circular indicator 38 with which the bubble 37 must be brought into coincidence to achieve leveling of mounting block 16. It will be appreciated that selective adjustment of the thumbwheels 29 controls the vertical extension of the radius ends 26 of the screws 25 to alter the level condition of mounting block 16 to bring it into a horizontal plane, at which time the bubble 37 will reside at the center of cylindrical container 36 concentric with circular indicator 38.

The base 15 has as a main upright member a post assembly, generally indicated by the numeral 40, extending substantially vertically of the mounting block 16 as seen in FIGS. 1–3, inclusive. As shown, the post assembly 40 has as its primary member a rectangular block 41. The block 41 is mounted generally medially of the mounting block 16 with a pair of sides 42 paralleling the sidewalls 19 of mounting block 16 and a pair of sides 43 spaced by the sides 42 which parallel the endwalls 20 of the mounting block 16.

The post assembly 40 supports and is interconnected with a latitude member, generally indicated by the numeral 45. The latitude member 45 has a latitude plate 46 which is an elongate bar-like member, which is seen best in FIGS. 1 and 4. The interconnection between the latitude plate 46 and the post 40 is effected by a sector plate 47. The sector plate 47 is rigidly attached to the side of latitude plate 46 as by a pair of screw fasteners 48 such that sector plate 47 extends generally perpendicularly of the latitude plate 46. The sector plate 47 has a bore 49 (FIG. 3) which receives a pivot pin 50. The pivot pin 50 also extends through a bore 51 in the block 41 and particularly between the sides 42 thereof. The pivot pin 50 has an end bore 52 which receives a fastener such as a cap screw 53 for retaining the pivot pin 50 in position. It thus can be seen that the sector plate 47 and attached latitude plate 46 rotate about the pivot pin 50 on the post assembly 40.

The angular position of the latitude member 45 relative to the post assembly 40 is maintained by a lock assembly, generally indicated by the numeral 55. As shown the lock assembly 55 consists of a lock block 56 which is attached to the rectangular block 41 as by a cap screw 57. The sector plate 47 has an inset on peripheral edge 58 which is engaged by a stepped engaging surface 59 of the lock block 56. It will thus be appreciated that the latitude member may be rotated about pivot pin 50 through the approximate 90° extent of the peripheral edge 58 of the sector plate 47. The sector plate 47 may be temporarily locked at any desired angular position by tightening the cap screw 57 so that lock block 56 effects clamping engagement. As best seen in FIG. 1, the sector plate 47 may be provided with numerical indicia indicating zero through 90° to provide a numerical readout at any angular position. The lock block 56 may be provided with a line indicator 60 positioned in proximity to the numerical indicia on the sector plate 47. The numerical indicia on sector plate 47 constitutes a latitude input indicator which places the upper surface 46' of the latitude plate 46 in a plane parallel to the equator of the earth.

The other components of the heliochronometer 10 are supported relative to the latitude member 45 by the latitude plate 46 and a gnomon assembly, generally indicated by the numeral 65. As best seen in FIGS. 1 and 2, the gnomon assembly 65 consists of a pivot shaft 66 having an enlarged head 67 at one extremity thereof and a reduced diameter portion 68 at the opposite end thereof which projects through the latitude plate 46. The gnomon assembly 65 is held in place on the latitude member 45 by a cap screw 69 which is threaded into a bore 70 in the reduced diameter portion 68 of the gnomon assembly 65. Extending longitudinally or axially of the enlarged head 67 is the gnomon 71 which as shown is a small cylindrical shaft that casts a thin linear shadow upon incidence of the sun's ray. The gnomon 71 is oriented substantially perpendicular to the upper surface 46' of latitude plate 46 such that with the latitude plate 46 positioned at the appropriate latitude of any location on the surface of the earth the gnomon 71 will be oriented substantially parallel to the axis of the earth.

Figure 4:
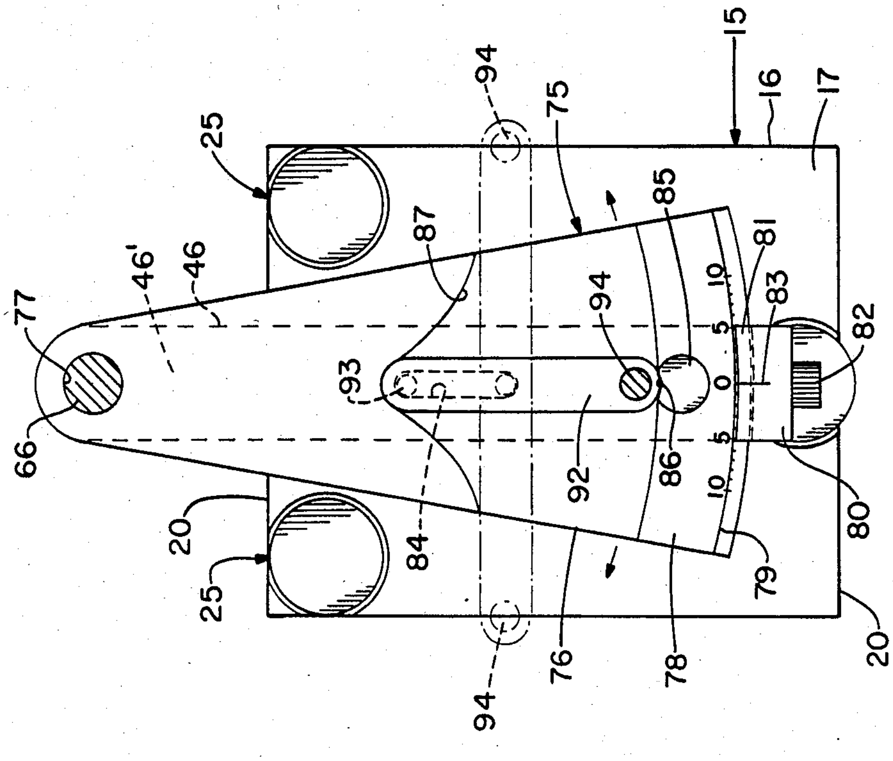
FIG. 4 is a top plan view, taken substantially along line 4—4 of FIG. 2, of the longitude plate shown overlying the latitude plate and the daylight savings lever shown in the standard time position.

Supported relative to the latitude member 45 and the gnomon assembly 65 is a longitude member, generally indicated by the numeral 75, as best seen in FIGS. 1, 2 and 4. As shown, the longitude member 75 consists of a sector shaped longitude plate 76 which engages the upper surface 46' of latitude plate 46 and has a bore 77 proximate one extremity thereof for rotation about the pivot shaft 66 of gnomon assembly 65 (FIG. 4). At the extremity of longitude plate 76 opposite the bore 77 the arcuate portion of the longitude plate 76 has numerical indicia extending to either side of a zero numerical designation located angularly centrally of the longitude plate 76. The numerical indicia to either side of the zero numerical indicia represents angular displacements to compensate for longitude deviation from the central meridian of the particular time zone. While normally deviation of only 7½° would be encountered, additional indicia are provided to handle situations where portions of time zones are established with irregular boundaries. The numerical time zone indicia are depicted on the upper surface 78 of the longitude plate 76 proximate the peripheral edge at the end opposite the bore 77 which has an inset 79. A clamp block 80 having a projecting flange 81 adapted to engage the inset 79 (FIG. 1) positions the longitude member 75 angularly relative to the latitude member 45 about pivot shaft 66. The clamp block 80 has a cap screw 82 passing therethrough which is threaded into latitude plate 46 so that a tightening of cap screw 82 forces clamp block 80 into locking engagement with the longitude plate 76 to maintain it in any desired angular position. The clamp block 80 may have on its upper surface a line indicator 83 for convenience in aligning the center of latitude plate 46 and pivot shaft 66 with respect to the numerical indicia on the upper surface 78 of longitude plate 76 for the particular angular correction required for the longitude at which the heliochronometer 10 is being located.

Figure 5:
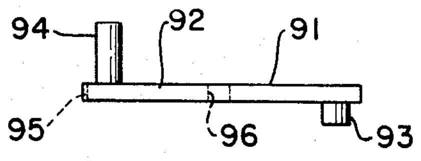
FIG. 5 is a side elevational view of the daylight savings lever shown in plan view in FIG. 4.

As essentially a correction to longitude, the longitude member 75 and gnomon assembly 65 interreact with a daylight savings adjustment assembly, generally indicated by the numeral 90, seen in FIGS. 1, 2 and 4–8. The daylight savings adjustment assembly 90 consists of a daylight savings lever 91 which interengages with the longitude plate 76. As best seen in FIGS. 4 and 5, the daylight savings lever 91 is a generally elongate bar 92 having a drift pin 93 at one extremity thereof which extends downwardly and engages an elongate longitudinal slot 84 formed in the longitude plate 76. The extremity of the lever 91 opposite the drift pin 93 has an upstanding stub shaft 94 for a purpose described hereinafter. The longitudinal extremity of bar 92 outwardly of the stub shaft 94 has a detent 95 for interaction with longitude member 75 as described hereinafter.

The longitude plate 76 has a locater screw 85 positioned at essentially the zero longitude indicia position on the longitude plate 76. The locater screw 85 has a nub 86, best seen in FIGS. 4 and 6, which is directed longitudinally of the longitude plate 76 and substantially in alignment with the elongate slot 84 and the bore 77 receiving pivot shaft 66 of gnomon assembly 65. As seen in FIG. 4, the nub 86 retainingly engages the detent 95 in lever 91 when the lever 91 is exactly aligned longitudinally of the longitude plate 76 with the drift pin 93 in the extremity of elongate slot 84 remote from the locater screw 85 and proximate to the pivot shaft 66 of gnomon assembly 65. Intermediate drift pin 93 and stub shaft 94 of lever 91 a pivot pin bore 96 is located essentially centrally of the bar 92 as best seen in FIGS. 4 and 5 for a purpose described hereinafter.

Figure 6:
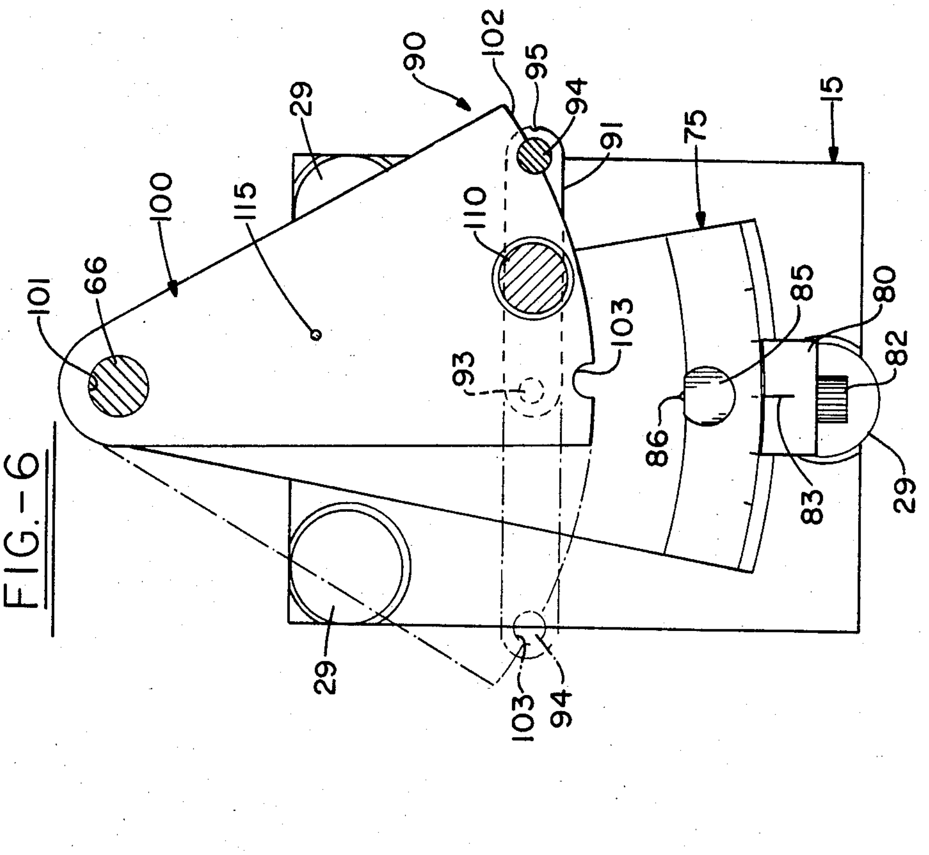
FIG. 6 is a top plan view, taken substantially along the line 6—6 of FIG. 2, of the daylight savings plate positioned atop and engaged by the daylight savings lever.

The daylight savings adjustment assembly 90 includes as a cooperating member with daylight savings lever 91 the daylight savings plate 100. The daylight savings plate 100 is of a generally triangular configuration having a bore 101 for free rotatable mounting on the pivot shaft 66 of gnomon assembly 65. The daylight savings plate 100 subtends an angle of somewhat in excess of 30° proximate the bore 101. The daylight savings plate 100 has an arcuate extremity 102 at the end opposite the bore 101. The arcuate extremity 102 has spaced notches 103 and 104 which are adapted to receive the stub shaft 94 of lever 91 in engagement therewith as particularly depicted in FIG. 6. In the solid line position of FIG. 6 daylight savings plate 100 is angularly positioned to the right of the longitudinal plate 76 through an angle of 15° to provide adjustment for daylight savings time in the northern hemisphere. As can be seen in FIG. 6 daylight savings time in the southern hemisphere can be compensated for by moving the daylight savings plate substantially 15° to the left of longitude plate 76 and moving the lever 91 through 180° from the solid line position of FIG. 6 to the chain line position depicted therein with the stub shaft 94 engaging the notch 103.

Figure 8:
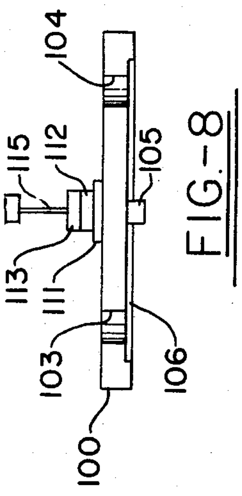
FIG. 8 is a front elevational view of the daylight savings plate shown in FIG. 7.

The daylight savings plate 100 is locked in either the standard time position of the lever 91 depicted in FIG. 4 or in the two daylight savings time positions depicted in FIG. 6 by virtue of a pivot pin 105 which extends from the bottom of daylight savings plate 100 at a position medially of but inset from the arcuate extremity 102 (FIG. 8). It will be appreciated that the pivot pin 105 engages the pivot pin bore 96 in the lever 91 in each of the three positions involving standard and daylight savings time.

Figure 7:
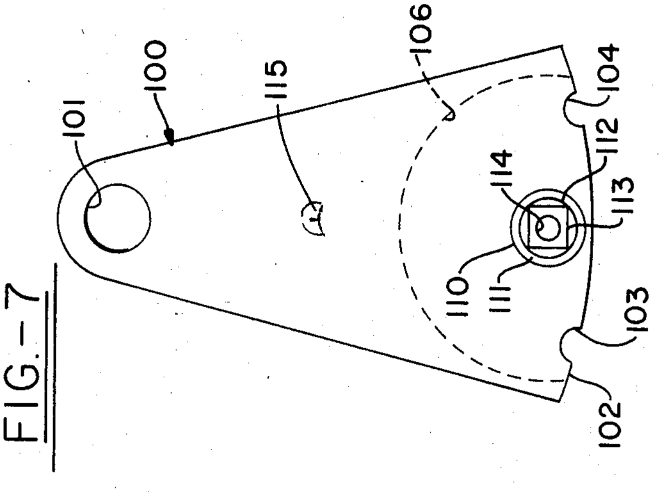
FIG. 7 is a top plan view of the daylight savings plate shown in FIG. 6.

In order to provide ease of movement and precision fit between the parts of the longitude plate 76 and the daylight savings adjustment assembly 90, the daylight savings plate 100 may have the surface portion radially outwardly of the line 87 recessed approximately the thickness of the lever 91. Thus, the lever 91 may reside between the longitude plate 76 and the daylight savings plate 100. As seen in FIGS. 7 and 8, the underside of daylight savings plate 100 may also be provided with a recess 106 which is generally circular to insure adequate space for noninterfering adjustment of the lever 91 between plates 100 and 76.

The daylight savings adjustment assembly 90 has as the member reflecting the adjustments for standard or daylight savings time an output locater post 110. The locater post 110 is positioned on a line between gnomon assembly 65 and locater screw 85 for standard time and 15° to either side thereof for daylight savings time in the northern and southern hemispheres as hereinabove described. The output locater post 110 as best seen in FIGS. 7 and 8 has a large diameter collar 111 nearest the daylight savings plate 100 with a small diameter collar 112 extending upwardly therefrom. The small collar 112 has a square nut 113 positioned thereon which has a threaded central bore 114 for a purpose to be described hereinafter.

The daylight savings plate 100 also has a reference indicator pin 115 associated with its upper surface. The pin 115 projects vertically upwardly and is located substantially on a line between the output locater post 110 and the bore 101 of the daylight savings plate 100. The purpose of the reference indicator pin 115 is detailed hereinafter.

Figure 9:
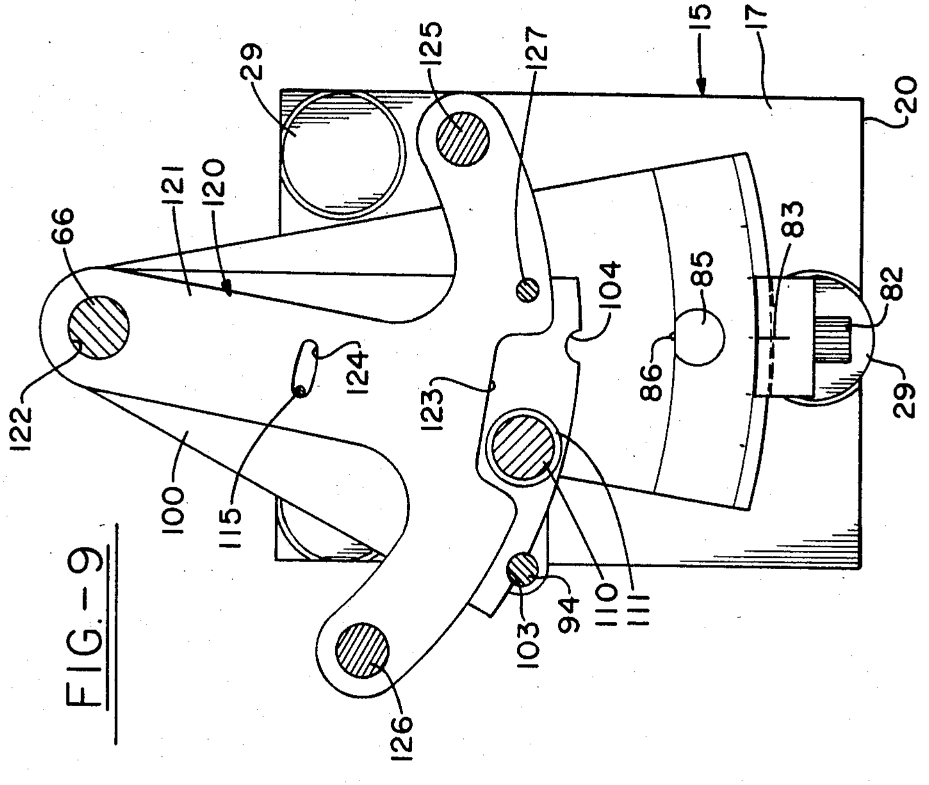
FIG. 9 is a top plan view, taken substantially along the line 9—9 of FIG. 1, showing the time dial support and underlying components.

Positioned atop and in operative engagement with the daylight savings adjustment assembly 90 and particularly the daylight savings plate 100 is a time dial support, generally indicated by the numeral 120. The time dial support 120, as best seen in FIGS. 1, 2 and 9, consists of a generally T-shaped arcuate plate 121. Proximate the base of the T-shaped plate 121 is a bore 122 to receive the shaft 66 of the gnomon assembly 65 about which plate 121 is pivoted.

The central portion of the head of the T-shaped arcuate plate 121 has an arcuate cutout 123 which is adapted to clear the large diameter collar 111 of the locater post 110 and permit angular movement of the plate 121 relative to the locater post 110. Interposed between the bore 122 and the arcuate cutout 123 is an arcuate clearance slot 124 in plate 121 through which the reference indicator pin 115 of the daylight savings plate 100 projects. As seen in FIG. 9 the pin 115 moves in slot 121 through an angle of essentially the same magnitude as plate 121 relative to the daylight savings plate 100.

The lateral extremities of the T-shaped arcuate plate 121 carry upstanding support posts 125 and 126 which are best seen in FIGS. 1 and 2. Proximate to but to one side of the arcuate cutout 123 the plate 121 has an upwardly projecting cam follower pin 127. The function of the support posts 125, 126 and the cam follower pin 127 are detailed hereinafter.

Figure 10:
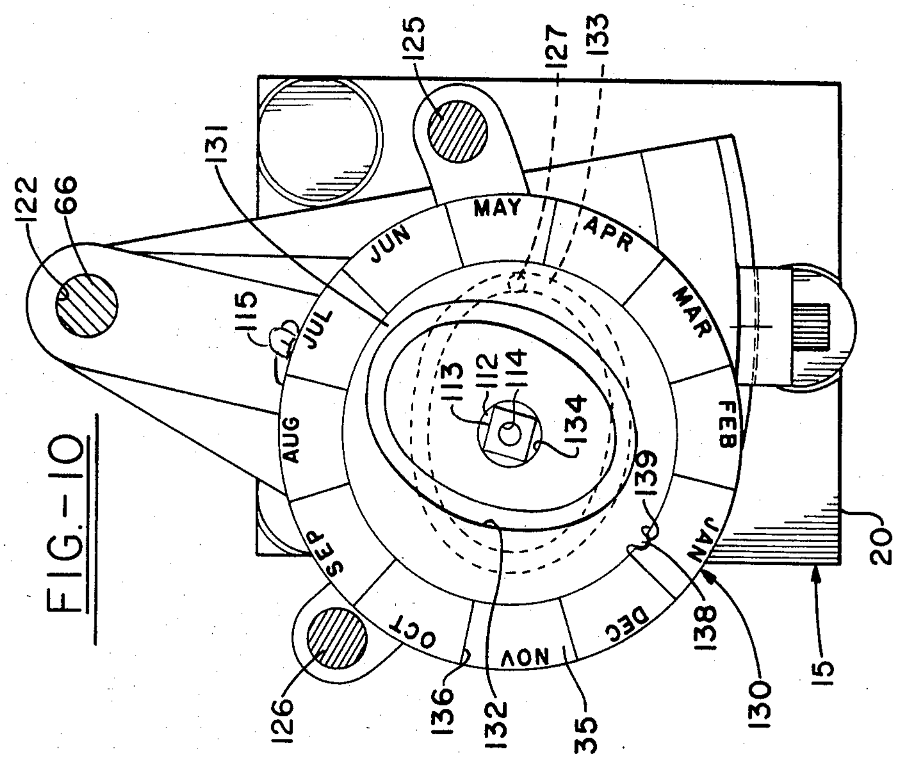
FIG. 10 is a top plan view, taken substantially along line 10—10 of FIG. 2, showing the equation of time cam with the operative cam groove for the northern hemisphere thereof facing downwardly in engagement with a cam follower pin on the surface of the time dial support, with the equation of time indicator dial encircling and interengaging the equation of time cam, and with the cam groove for the southern hemisphere shown in solid lines on the top of the equation of time cam.

The angular position of the time dial support 120 relative to the daylight savings plate 100 is established and maintained by an equation of time assembly, generally indicated by the numeral 130. The equation of time assembly 130 has an equation of time cam 131 which is best seen in FIG. 10 of the drawings. The equation of time cam 131 has a first cam groove 132 for the southern hemisphere on the upper surface thereof as depicted in FIG. 10 and a separate second groove 133 for the northern hemisphere as depicted in dotted lines in FIG. 10 on the reverse or lower side thereof in operative position. The equation of time cam 131 has a central bore 134 which matingly overfits the small diameter collar 112 of the locater post 110 of the daylight savings adjustment assembly 90, thereby permitting relative rotation of the equation of time cam 131.

Radially outwardly of the equation of time cam 131 and constituting another element of equation of time assembly 130 is an indicator dial 135. The indicator dial 135 contains arcuate incremental dividers 136 which separate the year into months and days. The equation of time cam 131 and particularly the continuous cam grooves 132 and 133 are related to and provide a correction for the time of the year by virtue of a predetermined relationship which is well known to persons skilled in the art. Thus, the angular relationship between the equation of time cam 131 and the indicator dial 135 is established and maintained by an index tab 138 on the cam 131 which engages a groove 139 on the indicator dial 135. The cam grooves 132 and 133 are plotted to effect the necessary adjustment for the equation of time when the month and day of the month on the indicator dial 135 is positioned adjacent the pin 115 of daylight savings plate 100. The cam follower pin 127 of the time dial support 120 engages the cam groove 133 on the lower side of cam 131 as seen in FIG. 10 to position the time dial support 120 angularly relative to the output locater post 110 and thus daylight savings plate 100 an angular distance for the correction necessary for the particular day of the year.

The equation of time assembly 130 also includes a cam cover 140 which overlies the equation of time cam 131. As seen in FIGS. 1, 2 and 11, the cam cover 140 is essentially a circular planar member having a central rectangular opening 141 which is adapted to nonrotatably engage the square nut 113 of the output locater post 110 of the daylight savings assembly 90. The cam cover 140 has a date marker 142 to which the date of the year is presented by manual rotation of the indicator dial 135 and rotationally interrelated equation of time cam 131. The cam cover 140 also has an upstanding indicator pin 143 for a purpose to be described hereinafter.

Figure 12:
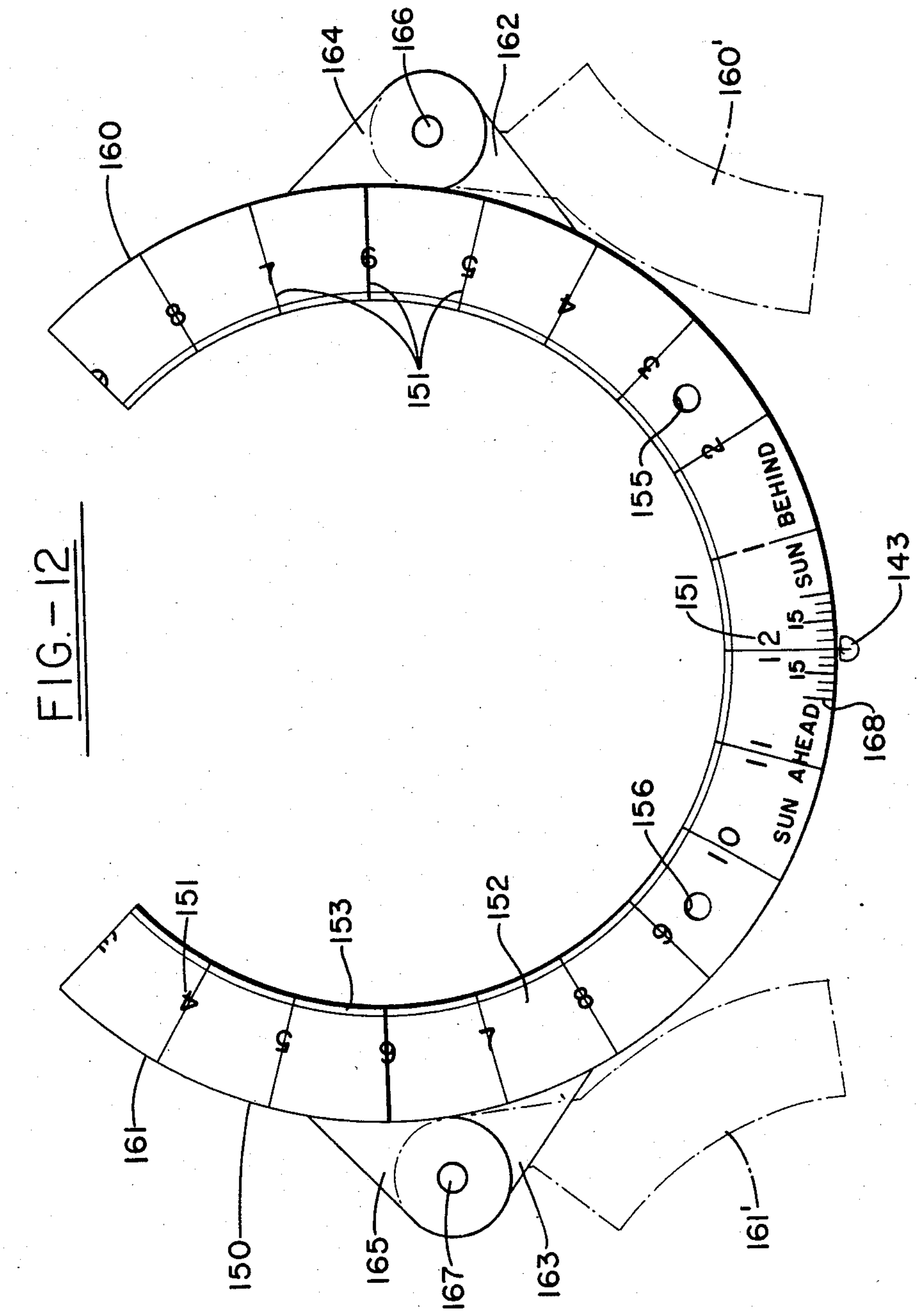
FIG. 12 is a fragmentary top plan view of the heliochronometer of FIGS. 1 and 2 showing the time dial with the arcuate extremities in solid lines where operatively positioned for early morning and late evening readings and in chain lines in a folded back position to prevent interference with incidence of sun rays on the gnomon at certain times of the year, with the dial showing solid numerals for use in one hemisphere and having the identical numerals on the reverse side in the order shown in chain lines, and with indicia showing adjustment of the time dial to compensate for deviation due to the equation of time.

With the position of the time dial support 120 having been established by the equation of time assembly 130 for the proper hemisphere, an equatorial time dial, generally indicated by the numeral 150, attaches to the support posts 125, 126 of time dial support 120. The time dial 150 is a generally circular segment having hours and fractions of an hour at various radial indicia 151 marked on the top surface 152 of the dial 150. For minimizing the number of parts and effecting double usage of existing parts, the time dial 150 is provided with indicia for the opposite hemisphere on the reverse side from that shown in FIG. 12. The sequence of numbers on the reverse side is shown in part in chain lines adjacent to the dial in FIG. 12. As shown, the top surface 152 of time dial 150 as viewed in FIG. 12 depicts in solid numbers on the dial surface 152 the numeral arrangement appropriate for the southern hemisphere; the reverse side depicted in representative fashion in chain lines is for use in the northern hemisphere.

The time dial 150 which is essentially a planar member as seen in FIGS. 1 and 2 presents the time dial 150 in a plane substantially perpendicular to the gnomon 71 by having the radially inner edge of the top surface 152 forming a downwardly and inwardly beveled edge 153. The beveled edge 153 permits an observer located at virtually any angle and expressly from angles other than in alignment with the sun to observe the precise point of incidence of the shadow of the gnomon 71 thereon.

The time dial 150 has for mounting on the time dial support 120 bores 155 and 156 which are spaced and positioned to overlie the support posts 125 and 126, respectively, with the 12:00 or noon radial indicia 151 located substantially medially thereof. The time dial 150 is affixed to support posts 125, 126 by cap screws 157 and 158 which project through the bores 155 and 156 and interengage threaded apertures (not shown) in the support posts 125 and 126, respectively, as best seen in FIGS. 1 and 2.

In order to permit early morning and late evening time readings, particularly in areas which experience extended daylight hours during a portion of the year, the sun dial 150 has extension segments 160 and 161 which carry indicia from 3:00 a.m. to 6:00 a.m. and 6:00 p.m. to 9:00 p.m. While this extended time capability is highly advantageous at times in certain geographic areas, the extension segments 160, 161 may provide objectionable interference with the incidence of the sun on the gnomon 71 during other time periods. This possible objection is overcome according to the concepts of the present invention by providing for the selective folding back of the extension segments 160, 161 to the chain line positions 160', 161' as viewed in FIG. 12. This capability of folding back the segment extensions 160, 161 is effected by mounting projecting ears 162, 163 on the time dial 150 proximate to each of the extension segments 160, 161 and similarly projecting ears 164, 165 on the segment extensions 160, 161. The ears 162 and 164 and the ears 163 and 165 overlap as best seen in FIG. 1 and have pivot pins 166 and 167 positioned in the respective overlapping ears. The segment extensions 160, 161 can thus be selectively pivoted in the plane of time dial 150 between the solid and chain line positions of FIG. 12 as required to effect readings during extended hours without adversely affecting operation of the heliochronometer 10 under other sun conditions.

The time dial 150 may also be provided with angular time indicia 168 on the radially outer portion of the top surface 152 proximate to the radial indicia 151 representing 12:00 noon to signify the amount of equation of time correction being introduced by the equation of time assembly 150 and whether the sun is ahead or behind by the indicated amount. The indicator pin 143 previously described in conjunction with cam cover 140 projects upwardly to a position proximate the indicia 168 to provide a reference for the requisite readout.

It is to be appreciated from the prior discussion that the heliochronometer 10 according to the present invention can readily be made of metallic elements to provide an inexpensive yet highly durable device. While other materials such as plastics might be employed metal having some extent of rust resistant characteristics is preferred. The only somewhat vulnerable element of the heliochronometer 10 is the relatively thin gnomon 71 which necessarily projects a substantial distance upwardly and outwardly of the time dial 150. If desired, the gnomon 71 may be provided with a cover, generally indicated by the numeral 170. The cover 170 may have a bulbous cup 171 adapted to fit over and surround the gnomon 71. The cup 171 may be readily supported by divergent arms 172 which terminate in perpendicularly oriented hollow cylindrical supports 173 which may replace the cap screws 157 and 158 attaching time dial 150 to time dial support 120 to thus retain cover 170 in position and affording protection to gnomon 71 despite an extent of axial or radial forces which may be applied thereto. The cover 170 may be made of a transparent plastic material to minimize interference with the appearance and viewing of the heliochronometer 10; however, other materials could be employed without adversely affecting the function and operation of the heliochronometer 10.

From the above discussion of the various assemblies of heliochronometer 10 it will be apparent to persons skilled in the art that once the heliochronometer 10 is appropriately set, in regard to latitude and longitude and daylight savings time for a particular location on the surface of the earth, daily adjustment is only necessary with respect to the equation of time by moving appropriate dates on the indicator dial 135 to the reference indicator pin 115 and or the date marker 142 of the cam cover 140. This operation can, of course, be performed without the necessity for disassembly of the heliochronometer 10. In the event that the heliochronometer 10 is moved to a different geographic location individual changes for latitude and longitude can readily be made as hereinabove described. It is not necessary to partially disassemble the heliochronometer 10 in areas where changes from standard to daylight savings time are observed. It is only necessary to adjust the daylight savings assembly 90 on two occasions during the year.

Thus it should be evident that the heliochronometer disclosed herein carries out the various objects of the invention set forth hereinabove and otherwise constitutes an advantageous contribution to the art. As may be apparent to persons skilled in the art, modifications can be made to the preferred embodiment disclosed herein without departing from the spirit of the invention, the scope of the invention being limited solely by the scope of the attached claims.

I claim:

1. A heliochronometer for providing accurate clock time readouts at any known latitude and longitude location on the earth comprising, base means to effect precision orientation and level mounting and having upstanding post means, latitude plate means adjustably angularly positionable relative to said post means for selecting a particular latitude, gnomon means extending upwardly from said latitude plate means, longitude plate means adjustably pivotally mounted about said gnomon means for effecting a longitude correction, time dial support means pivotally mounted about said gnomon means and having an arcuate time dial on which the shadow of said gnomon means is projected, and means interconnecting said longitude plate means and said time dial support means for adjusting the angular position of said time dial for daylight savings time and the equation of time.

2. A heliochronometer according to claim 1, wherein said means interconnecting said longitude plate means and said time dial support means includes daylight savings adjustment means pivotally mounted about said gnomon means.

3. A heliochronometer according to claim 2, wherein said daylight savings adjustment means includes daylight savings plate means adjustably positionable relative to said longitude plate means for standard time and daylight savings time settings for both hemispheres.

4. A heliochronometer according to claim 3, wherein said daylight savings plate means is pivotally mounted on said gnomon means and lever means interengages said longitude plate means and said daylight savings plate means.

5. A heliochronometer according to claim 4, wherein said lever means has a drift pin engaging an elongate slot in said longitude plate means and an upstanding stub shaft which engages notches in said daylight savings plate means for daylight savings time settings for both hemispheres.

6. A heliochronometer according to claim 4 wherein said lever means has a detent for engaging a nub on a locater screw on said longitude plate means, whereby said daylight savings plate means is aligned with said longitude plate means.

7. A heliochronometer according to claim 4, wherein said daylight savings plate means has a locater post which is positioned medially thereof and registers the arcuate position of said daylight savings plate means relative to said longitude plate means by the position of said lever means.

8. A heliochronometer according to claim 4, wherein said daylight savings plate means has a lock pin which engages a lock pin bore in said lever means in each of the standard time and the daylight savings time settings.

9. A heliochronometer according to claim 1, wherein said means interconnecting said longitude plate means and the dial support means includes equation of time means for positioning said time dial support means to correct for the time of the year.

10. A heliochronometer according to claim 9, wherein said equation of time means includes an equation of time cam rotatably mounted on a locater post constituting the output of a daylight savings adjustment assembly and positioning said time dial support means relative thereto.

11. A heliochronometer according to claim 10 wherein said equation of time cam has cam groove means engaged by cam follower means of said time dial support means.

12. A heliochronometer according to claim 11, wherein said cam groove means includes a first cam groove on one side of said equation of time cam and a second cam groove on the other side of said equation of time cam, one of said cam grooves providing correction for the northern hemisphere and the other of said cam grooves providing correction for the southern hemisphere.

13. A heliochronometer according to claim 12, wherein said equation of time means includes an indicator dial positioned radially outwardly of said equation of time cam and maintained in fixed angular relationship thereto by interengaging tab and groove members, said indicator dial having arcuate incremental dividers which separate the year into months and days.

14. A heliochronometer according to claim 13, wherein said equation of time means includes a cam cover having a marker indicating the date correction of said indicator dial and having an indicator pin extending proximate to indicia on said arcuate time dial indicating the equation of time correction.

15. A heliochronometer according to claim 1, wherein said time dial support means is generally T-shaped with a bore to receive a shaft of said gnomon means and a cutout at the extremity opposite said bore to receive a locater post of said daylight savings adjustment assembly and permit an extent of relative angular movement therebetween.

16. A heliochronometer according to claim 15, wherein said time dial support means has support ports on which said arcuate time dial is mounted.

17. A heliochronometer according to claim 1, wherein said arcuate time dial is substantially planar and has radial indicia representing hours and fractions of an hour on both sides thereof, one side having hours arranged for the northern hemisphere and the other side having hours arranged for the southern hemisphere.

18. A heliochronometer according to claim 1, wherein said arcuate time dial is substantially planar and positioned in a plane substantially perpendicular to the gnomon, said arcuate time dial having the radially inner edge beveled downwardly and inwardly of said time dial, whereby the incidence of the shadow of said gnomon means on said edge may be observed from virtually any angle.

19. A heliochronometer according to claim 1, wherein said arcuate time dial has extension segments to permit early morning and late evening time readouts.

20. A heliochronometer according to claim 19, including means for moving said extension segments in the plane of said arcuate time dial to preclude interference with the incidence of sun rays on said gnomon means during certain time periods.

21. A heliochronometer according to claim 19, including a pair of extension segments with said segments and proximate portions of said arcuate time dial having projecting ears which overlap and have pivot pins therein.

22. A heliochronometer according to claim 1, including cover means for said gnomon means providing protection and support therefor.

23. A heliochronometer according to claim 22, wherein said cover means includes a cap fitting over said gnomon means and means for attachment to said time dial support means.

24. A heliochronometer according to claim 1, wherein said base means has built-in compass means and leveling means.

* * * * *